United States Patent
Wieskamp et al.

(10) Patent No.: US 10,235,875 B2
(45) Date of Patent: Mar. 19, 2019

(54) VEHICLE COMMUNICATION SYSTEM FOR CLOUD-HOSTING SENSOR-DATA

(71) Applicant: Aptiv Technologies Limited, St. Michael (BB)

(72) Inventors: Jonathan L. Wieskamp, Santa Clara, CA (US); Uday Pitambare, Mountain View, CA (US)

(73) Assignee: APTIV TECHNOLOGIES LIMITED (BB)

( * ) Notice: Subject to any disclaimer, the term of this patent is extended or adjusted under 35 U.S.C. 154(b) by 247 days.

(21) Appl. No.: 15/237,729

(22) Filed: Aug. 16, 2016

(65) Prior Publication Data

US 2018/0053403 A1    Feb. 22, 2018

(51) Int. Cl.
| | |
|---|---|
| *G06F 15/173* | (2006.01) |
| *G08G 1/01* | (2006.01) |
| *G08G 1/16* | (2006.01) |
| *H04L 12/801* | (2013.01) |
| *G01S 5/00* | (2006.01) |
| *G01S 13/93* | (2006.01) |
| *G05D 1/02* | (2006.01) |
| *H04L 29/08* | (2006.01) |

(52) U.S. Cl.
CPC .......... *G08G 1/0112* (2013.01); *G01S 5/0072* (2013.01); *G01S 13/931* (2013.01); *G05D 1/0257* (2013.01); *G05D 1/0297* (2013.01); *G08G 1/0133* (2013.01); *G08G 1/162* (2013.01); *G08G 1/164* (2013.01); *H04L 47/12* (2013.01); *H04L 47/14* (2013.01); *G01S 2013/936* (2013.01); *G05D 2201/0213* (2013.01); *H04L 67/12* (2013.01)

(58) Field of Classification Search
USPC .......................................................... 709/224
See application file for complete search history.

(56) References Cited

U.S. PATENT DOCUMENTS

| | | | |
|---|---|---|---|
| 6,226,570 B1 | 5/2001 | Hahn | |
| 9,494,439 B1 * | 11/2016 | Ross | B60W 50/029 |

(Continued)

OTHER PUBLICATIONS

Behere Sagar et al: "A reference architecture for cooperative driving", Journal of Systems Architecture, vol. 59, No. 10, Nov. 2013, pp. 1095-1112.

*Primary Examiner* — Melvin H Pollack
(74) *Attorney, Agent, or Firm* — Lawrence D. Hazelton

(57) ABSTRACT

A vehicle communication system for cloud-hosting sensor-data from a plurality of vehicles where each of the vehicles is equipped with one or more sensors used to detect objects proximate to each of the vehicles includes a transceiver and a controller. The transceiver is used to communicate sensor-data from a first-sensor on a first-vehicle and from a second-sensor on a second-vehicle. The controller is configured to receive, via the transceiver, first-data from the first-sensor and second-data from the second-sensor, and determine when the first-data and the second-data are both indicative of an object proximate to the first-vehicle and the second-vehicle, where the first-data is characterized by a first-confidence and the second-data is characterized by a second-confidence. The controller is configured to prevent communication of the second-data to the first-vehicle when the first-confidence is greater than the second-confidence.

7 Claims, 3 Drawing Sheets

(56) References Cited

U.S. PATENT DOCUMENTS

| | | |
|---|---|---|
| 9,648,107 B1* | 5/2017 | Penilla .................... H04L 67/12 |
| 10,043,211 B2* | 8/2018 | Joshi .................. G06Q 30/0269 |
| 2005/0137756 A1 | 6/2005 | Takahashi |
| 2007/0100537 A1 | 5/2007 | Parikh et al. |
| 2007/0112503 A1 | 5/2007 | Johnson et al. |
| 2007/0213922 A1 | 9/2007 | Van Buer et al. |
| 2010/0019891 A1 | 1/2010 | Mudalige |
| 2010/0198513 A1 | 8/2010 | Zeng et al. |
| 2014/0104077 A1 | 4/2014 | Engel et al. |
| 2016/0358477 A1* | 12/2016 | Ansari ................... G08G 1/167 |
| 2016/0359664 A1* | 12/2016 | Malegaonkar ............ G06F 8/34 |
| 2017/0034470 A1* | 2/2017 | Kleinrock ............... H04L 67/12 |
| 2017/0048308 A1* | 2/2017 | Qaisar ................. H04L 67/1002 |
| 2017/0082987 A1* | 3/2017 | Reddy .................... H04L 67/10 |
| 2017/0124781 A1* | 5/2017 | Douillard ................. B60Q 1/26 |
| 2017/0214744 A1* | 7/2017 | Neves .................... H04L 67/12 |
| 2017/0313332 A1* | 11/2017 | Paget ................. B61L 27/0077 |
| 2017/0353833 A1* | 12/2017 | de Barros Chapiewski ................ H04W 4/029 |
| 2017/0358204 A1* | 12/2017 | Modica ................ G08G 1/0112 |
| 2017/0365166 A1* | 12/2017 | Lu .................... G08G 1/096783 |
| 2017/0366616 A1* | 12/2017 | Rodrigues Nascimento ............... H04L 67/34 |
| 2017/0374493 A1* | 12/2017 | Pereira Cabral ........ H04W 4/70 |
| 2018/0031384 A1* | 2/2018 | Lee ...................... G01C 21/365 |
| 2018/0075747 A1* | 3/2018 | Pahwa .................. B60W 40/09 |
| 2018/0222388 A1* | 8/2018 | Shenoy ................. B60Q 9/008 |

* cited by examiner

VEHICLE COMMUNICATION SYSTEM FOR CLOUD-HOSTING SENSOR-DATA

TECHNICAL FIELD OF INVENTION

This disclosure generally relates to a vehicle communication system for cloud-hosting of sensor-data, and more particularly relates to a system that selectively manages sensor-data from multiple sensors on multiple automated vehicles.

BACKGROUND OF INVENTION

It is known that automated vehicles are equipped with multiple sensors such as radar-units, lidar-units, and/or cameras. When traffic density is high, many objects may be sensed by multiple vehicles and sensors. When the sensors emit detection signals as do radar-units and lidar-units, there is a risk of return signals being confused. Also, when sensor-data is shared or collected by an information distribution system the amount of data may cause undesirable congestion and general noise on specific parts of spectrum.

SUMMARY OF THE INVENTION

Described herein is a system that cloud hosts (i.e. collects, redistributes, utilizes) sensor information from the multiple sensors that a vehicle has and from multiple vehicles. The system then aggregates or compiles and shares this aggregated information among the various vehicles. Then, for example, if vehicles that are in highly dense areas of traffic or platooning can selectively turn off sensors or switch to low power mode/reduced capability to reduce noise on the spectrum and conserve energy.

In accordance with one embodiment, a vehicle communication system for cloud-hosting sensor-data from a plurality of vehicles where each of the vehicles is equipped with one or more sensors used to detect objects proximate to each of the vehicles is provided. The system includes a transceiver and a controller. The transceiver is used to communicate sensor-data from a first-sensor on a first-vehicle and from a second-sensor on a second-vehicle. The controller is configured to receive, via the transceiver, first-data from the first-sensor and second-data from the second-sensor, and determine when the first-data and the second-data are both indicative of an object proximate to the first-vehicle and the second-vehicle, where the first-data is characterized by a first-confidence and the second-data is characterized by a second-confidence. The controller is configured to prevent communication of the second-data to the first-vehicle when the first-confidence is greater than the second-confidence.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
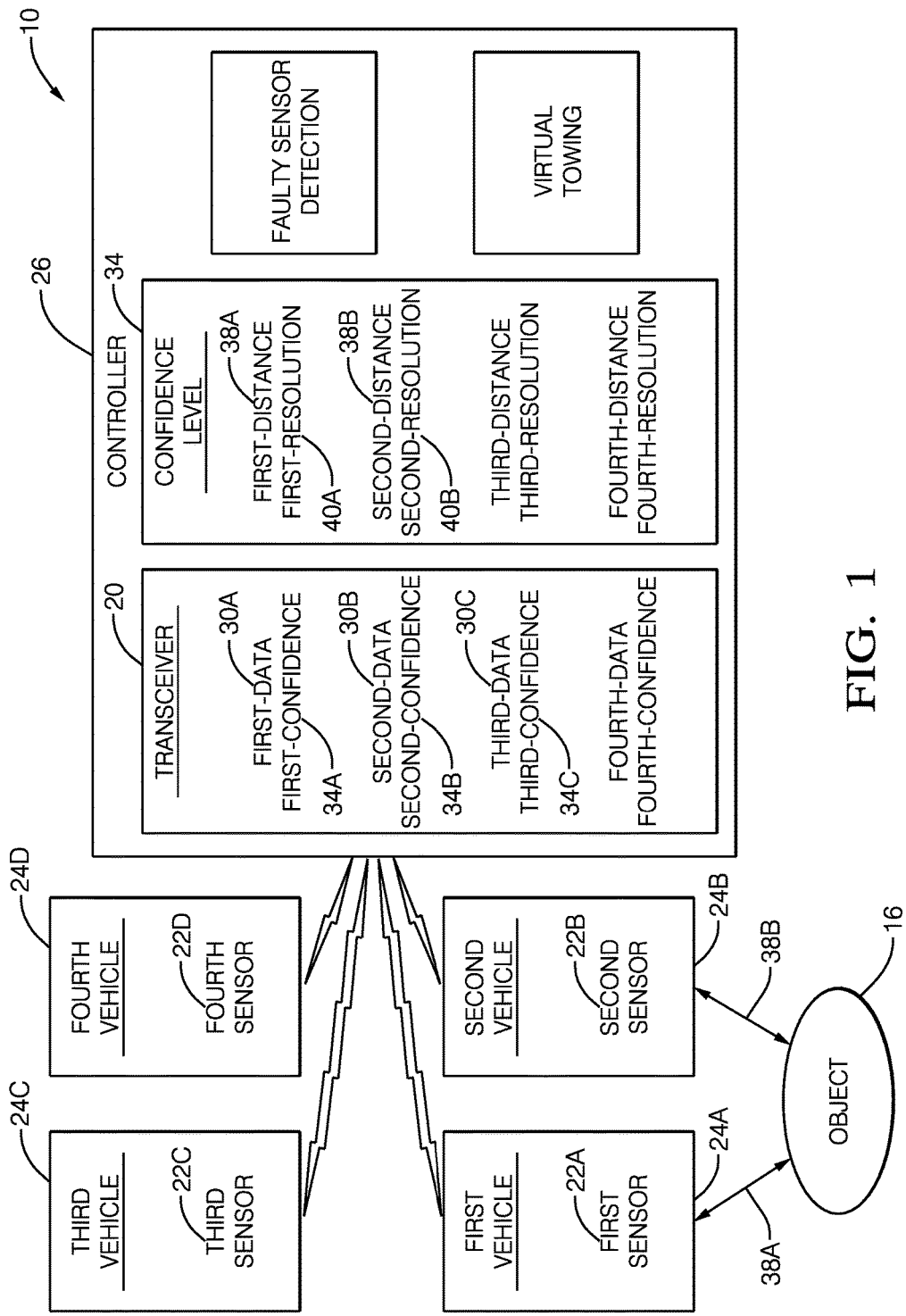
FIG. 1 is a diagram of a vehicle communication system in accordance with one embodiment.

FIG. 1 illustrates a non-limiting example of a vehicle communication system 10, hereafter referred to as the system 10, for cloud-hosting of sensor-data 14 from a plurality of vehicles 12. In general, each of the vehicles 12 is equipped with one or more sensors used to detect objects, e.g. the object 16, proximate to each of the vehicles 12. While the examples presented may be characterized as being generally directed to instances when the vehicles 12 are being operated in an automated-mode, i.e. a fully autonomous mode, where a human operator (not shown) of each instance of the vehicles 12 does little more than designate a destination, it is contemplated that the teachings presented herein are useful when one or more of the vehicles 12 are operated in a manual-mode. While in the manual-mode the degree or level of automation may be little more than providing steering assistance to the human operator who is generally in control of the steering, accelerator, and brakes of the vehicles 12. That is, the system 10 may only assist the human operator as needed to, for example, keep the vehicles 12 centered in a travel-lane, maintain control of the vehicles 12, and/or avoid interference and/or a collision with another vehicle.

The system 10 includes a transceiver 20 used to communicate the sensor-data 14 from a first-sensor 22A on a first-vehicle 24A and from a second-sensor 22B on a second-vehicle 24B. The transceiver 20 may be, for example, similar to those used for the well-known vehicle-to-infrastructure (V2I) and vehicle-to-vehicle (V2V) communications. While many of the examples set forth below describe how the system 10 interacts with two instances of the vehicles 12, is it contemplated that typically there will be more than two vehicles involved. For example, there may also be a third-vehicle 24C equipped with a third-sensor 22C and a fourth-vehicle 24D equipped with a fourth-sensor 22D. Furthermore, while the examples presented herein might be interpreted to suggest that each of the vehicles 12 is equipped with only a single sensor, this is done only to simplify the explanation. That is, it is recognized that most instances of the vehicles 12 will be equipped with multiple sensors including multiple instances of different types of sensors (e.g. radar-unit, lidar-unit, camera, ultrasonic-transducer, etc.) and/or multiple instances of the same type of sensor (e.g. a forward-view, rearward-view, leftward-view and rightward-view radar-units or cameras).

The system 10 includes a controller 26 configured to receive, via the transceiver 20, first-data 30A from the first-sensor 22A and second-data 30B from the second-sensor 22B, and data from any other vehicles suitably equipped and within range of the transceiver 20. The controller 26 may be co-located with the transceiver 20, or may be remotely located from the transceiver 20 and in communication with other instances of transceivers not show here. The controller 26 may include a processor (not specifically shown) such as a microprocessor or other control circuitry such as analog and/or digital control circuitry including an application specific integrated circuit (ASIC) for processing data as should be evident to those in the art. The controller 26 may include memory (not specifically shown), including non-volatile memory, such as electrically erasable programmable read-only memory (EEPROM) for storing one or more routines, thresholds, and captured data. The one or more routines may be executed by the processor to perform steps for determining the location of the object 16 based on signals received by the controller 26 from the transceiver 20 as described herein.

The advantages of providing the system 10 to collect information about the surroundings of multiple vehicles (i.e. detect the object 16) and then distribute that information to other vehicles has been discussed in the literature. To overcome the problems of too much information being transmitted to the transceiver 20 and/or processed by the controller 26, and inter-sensor interference, the system 10 is configured to 'cloud-host' (i.e. aggregate or compile and subsequently share) all of the sensor-data 14 from the vehicles 12. Then, vehicles that are in highly dense areas of traffic or platooning can selectively turn off some of the sensors and/or switch to low power mode/reduced capability to reduce noise on the spectrum and conserve energy.

Figure 2:
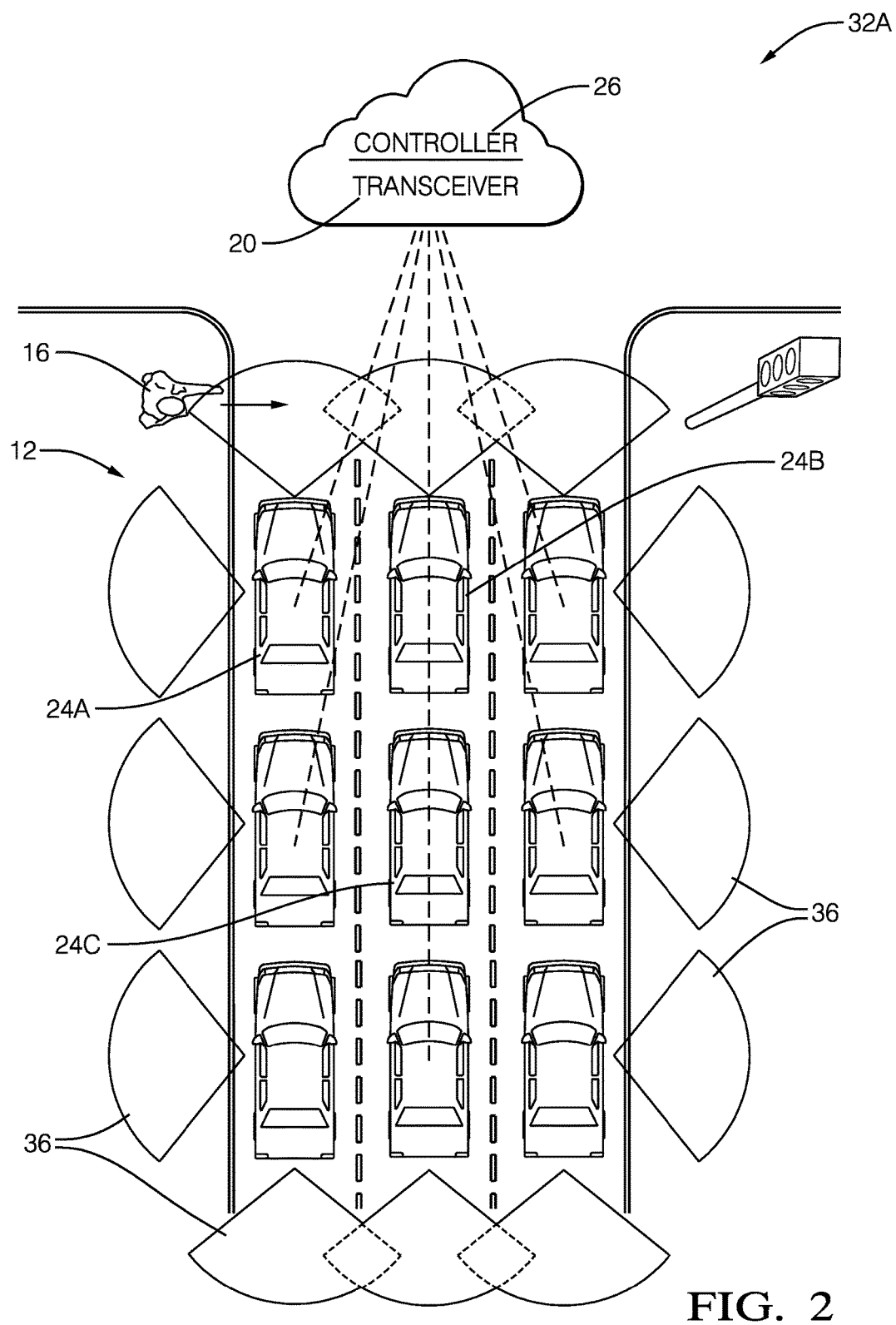
FIG. 2 is an illustration of a traffic-scenario encountered by the system of FIG. 1 in accordance with one embodiment.

FIG. 2 illustrates a non-limiting example of a traffic-scenario 32A where many vehicles are in close proximity to each other. If each of the vehicles 12 is equipped with individual sensors for sensing forward, rearward, leftward, and rightward of each vehicle, an unnecessary amount of data may be communicated to the controller via the transceiver 20. It should be evident from the drawing that only the sensors directed away from the group of vehicles are necessary to detect the object 16, in this case a pedestrian, so some of the sensors can be turned off and/or operated in a short-range mode, as suggested by the limited number of fields-of-view 36.

By way of example and not limitation, and referring again to FIG. 1, the controller 26 may be configured to determine when the first-data 30A and the second-data 30B are both indicative of the object 16, i.e. both detect and/or report the presence of the object 16, proximate to the first-vehicle 24A and the second-vehicle 24B. In order to determine which of the first-data 30A and the second-data 30B is preferable to use to communicate the presence and/or location of the object 16 to, for example, the third vehicle 24C and the fourth vehicle 24D, the first-data 30A may be characterized by a first-confidence 34A and the second-data 30B may be characterized by a second-confidence 34B. Various methods by which a confidence level 34 can be determined will be described in more detail later.

Once a confidence level 34 is determined for the sensor-data 14 that was received, then the controller 26 may prevent or avoid communication (i.e. retransmitting) of the second-data 30B to the first-vehicle 24A (and/or to the third vehicle 24C and/or to the fourth vehicle 24D) when the first-confidence 34A is greater than the second-confidence 34B. By way of further example, if the first-data 30A has the highest confidence of all of the sensor-data 14, the controller 26 may base information transmitted about the presence/location of the object 16 only (i.e. solely) on the first-data 30A.

In addition to, or as an alternative to, preventing communication of sensor data with relatively low confidence values when sensor data with a relatively high confidence value is available, the system 10 may be configured to, for example, disable (i.e. temporarily turn-off) the second-sensor 22B when the first-confidence 34A is greater than the second-confidence 34B. For example, and referring again to FIG. 2, if the leftward sensor of the second vehicle 24B (field-of-view not shown to indicate that the sensor has been disabled) was able to get a glimpse of the object 16, i.e. detect the object 16 with low-confidence, but the forward sensor of the first vehicle 24A detected the object 16 with high confidence, the system 10 disabled the leftward sensor of the second vehicle 24B. If the leftward sensor was a radar-unit, disabling this sensor or reducing the strength of the radar signal emitted by the radar-sensor helps to reduce the noise level in the portion of the electromagnetic spectrum where the radar-unit operates.

As noted above, there are several ways the confidence level 34 of sensor data can be determined. For example and referring to FIG. 1, the first-confidence 34A may be based on a first-distance 38A from the first-sensor 22A to the object 16, and the second-confidence 34B may be based on a second-distance 38B from the second-sensor 22B to the object 16. As suggested in FIG. 1, the first-confidence 34A is greater than the second-confidence 34B because the first-distance 38A is less than the second-distance 38B. If a sensor is a radar-unit, the distance may be directly measured by the radar-unit, and/or indicated by the signal strength of the return signal from the object 16.

By way of another example, the first-confidence 34A may be based on a first-resolution 40A that the object 16 is indicated by the first-sensor 22A; the second-confidence 34B may be based on a second-resolution 40B that the object 16 is indicated by the second-sensor 22B. If the first-sensor 22A and the second-sensor 22B are both cameras, then how many pixels are used to record an image of the object 16 may be an indication of the first resolution 40A and the second-resolution 40B. By way of another example, the resolution may be indicated by the angular resolution of each sensor if the sensor is a radar-unit or a lidar-unit. However the resolution is determined, the first-confidence 34A is greater than the second-confidence 34B when the first-resolution 40A is greater than the second-resolution 40B.

Another advantage of the system 10 described herein is that the controller 26 may be configured to communicate the first-data 30A to a third-vehicle 24C equipped with a third-sensor 22C when a view to the object 16 from the third-sensor 22C is obstructed. That the view to the object 16 from the third-sensor 22C is obstructed may be determined by the controller by assessing the relative positions of the vehicles 12 and the object. Alternatively, that the view is obstructed may be indicated simply by the fact that the third sensor 22C does not indicate the presence of the object 16. However, it is recognized that the third sensor 22C may fail to detect the object 16 because the third sensor 22C is faulty, i.e. broken, or has malfunctioned. It is contemplated that the functional status (faulty vs. not faulty) of a sensor can be tested by determining if the sensor in question is able to detect anything other than the object 16. In FIG. 2 it is reasonably apparent that almost any sensor on the third vehicle 24C would be unlikely able to detect the object 16 due to obstruction by the first vehicle 24A. However, sensors on the third vehicle 24C, e.g. the third sensor 22C, would be able to detect at least one of the other vehicles, e.g. the first vehicle 24A and/or the second vehicle 24B. As such, the system is able to determine when, for example, the third sensor 22C is faulty.

Figure 3:
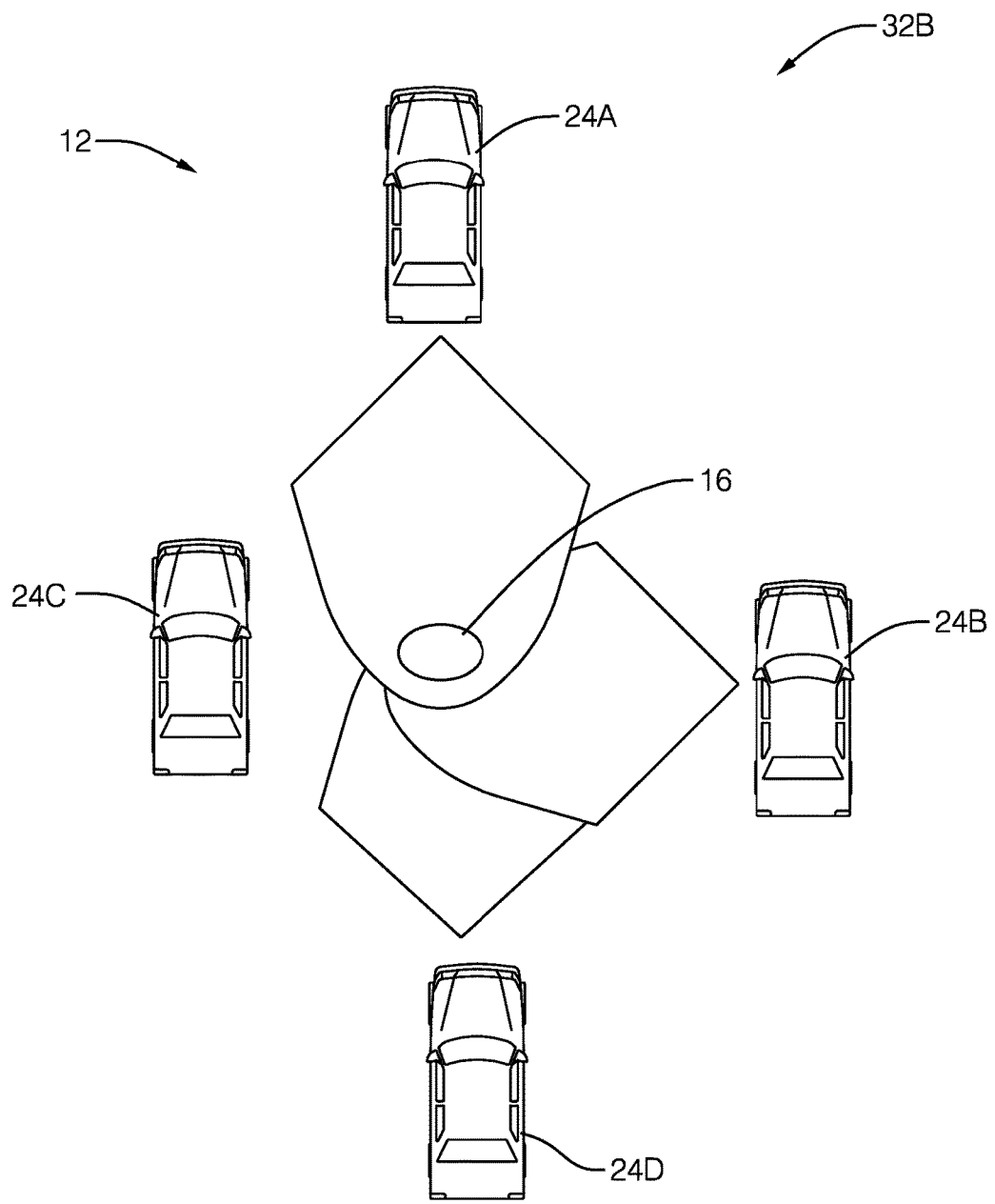
FIG. 3 is an illustration of a traffic-scenario encountered by the system of FIG. 1 in accordance with one embodiment.

FIG. 3 illustrates a non-limiting example of another traffic-scenario 32B where the first vehicle 24A, the second vehicle 24B, the third vehicle 24C, and the fourth vehicle 24D are arranged around an undefined instance of the object 16, possibly another vehicle such as a motorcycle for example. The illustration suggests that sensors on the third vehicle 24C are unable to detect the object 16. The controller 26 (FIG. 1) is configured to receive, via the transceiver 20, third-data 34C from the third-sensor 22C on the third-vehicle, determine when the first-data 30A, the second-data 30B, and the third-data 30C should all be indicative of the object 16, and classify the third-sensor 22C as faulty when the third-data 34C is not indicative of the object 16. That is, if the system 10 determines the relative locations of the vehicles 12 to the object 16, and determines that the third sensor 22C on the third vehicle 24C is in a position that should enable the third sensor 22C to detect the object 16, but the third sensor 22C fails to do so, the system classifies the third-sensor 22C as faulty.

If the third sensor 22C is classified or deemed to be faulty, the third vehicle 24C on which the third sensor 22C is mounted could be considered to be partially blind. However, it is contemplated that the sensor data 14 from the other sensors monitored by the system 10 could be provided to the third vehicle 24C to provide a 'virtual tow' to the third vehicle 24C. In case of a vehicle with malfunctioned sensor and operating with limited functionality, the system can pair the third vehicle 24C with, for example, the first vehicle 24A which is going on the same route and ensure the third vehicle 24C reaches as close as possible to the destination or a service center on the way if possible. As such, the controller 26 may be configured to communicate the first-data 30A to the third-vehicle 24C for operating the third-vehicle 24C when the third-sensor 22C is classified as faulty.

Accordingly, a vehicle communication system (the system 10), a controller 26 for the system 10, and a method of operating the system 10 is provided. The system 10 provides for sharing of the sensor data from multiple sensors on multiple vehicles, provides for reducing system noise caused by multiple sensors detecting the same object, and assisting a vehicle when a sensor on that vehicle is faulty.

While this invention has been described in terms of the preferred embodiments thereof, it is not intended to be so limited, but rather only to the extent set forth in the claims that follow.

We claim:

1. A vehicle communication system for cloud-hosting sensor-data from a plurality of vehicles, wherein each of the vehicles is equipped with one or more sensors used to detect objects proximate to each of the vehicles, said system comprising:
   a transceiver used to communicate sensor-data from a first-sensor on a first-vehicle and from a second-sensor on a second-vehicle; and
   a controller configured to receive, via the transceiver, first-data from the first-sensor and second-data from the second-sensor, determine when the first-data and the second-data are both indicative of an object proximate to the first-vehicle and the second-vehicle, wherein the first-data is characterized by a first-confidence and the second-data is characterized by a second-confidence, and the controller is configured to prevent communication of the second-data to the first-vehicle when the first-confidence is greater than the second-confidence.

2. The system in accordance with claim 1, wherein the system is configured to disable the second-sensor when the first-confidence is greater than the second-confidence.

3. The system in accordance with claim 1, wherein the first-confidence is based on a first-distance from the first-sensor to the object, the second-confidence is based on a second-distance from the second-sensor to the object, and the first-confidence is greater than the second-confidence when the first-distance is less than the second-distance.

4. The system in accordance with claim 1, wherein the first-confidence is based on a first-resolution that the object is indicated by the first-sensor, the second-confidence is based on a second-resolution that the object is indicated by the second-sensor, and the first-confidence is greater than the second-confidence when the first-resolution is greater than the second-resolution.

5. The system in accordance with claim 1, wherein the controller is configured to communicate the first-data to a third-vehicle equipped with a third-sensor when a view to the object from the third-sensor is obstructed.

6. The system in accordance with claim 1, wherein the controller configured to receive, via the transceiver, third-data from a third-sensor on a third-vehicle, determine when the first-data, the second-data, and the third-data should all be indicative of the object, and classify the third-sensor as faulty when the third-data is not indicative of the object.

7. The system in accordance with claim 6, wherein the controller configured to communicate the first-data to the third-vehicle for operating the third-vehicle when the third-sensor is classified as faulty.

* * * * *